US009160592B2

(12) United States Patent
Zhang et al.

(10) Patent No.: US 9,160,592 B2
(45) Date of Patent: Oct. 13, 2015

(54) SYSTEM AND METHOD FOR SINGLE CARRIER OPTIMIZATION FOR EVOLVED MULTIMEDIA BROADCAST MULTICAST SERVICE

(75) Inventors: Xiaoxia Zhang, San Diego, CA (US); Yongbin Wei, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/401,540

(22) Filed: Feb. 21, 2012

(65) Prior Publication Data

US 2012/0213143 A1 Aug. 23, 2012

Related U.S. Application Data

(60) Provisional application No. 61/445,983, filed on Feb. 23, 2011.

(51) Int. Cl.
*H04H 20/71* (2008.01)
*H04L 27/26* (2006.01)
*H04L 5/00* (2006.01)

(52) U.S. Cl.
CPC ............ *H04L 27/2607* (2013.01); *H04L 5/001* (2013.01); *H04L 5/0035* (2013.01);
(Continued)

(58) Field of Classification Search
CPC ... H04L 5/0007; H04L 5/005; H04L 27/2607; H04W 72/005; H04W 4/06
USPC .................. 370/312, 252, 344, 315, 203–210, 370/328–330, 389–390, 432; 455/456.1, 455/418, 550.1; 375/259–299
See application file for complete search history.

(56) References Cited

U.S. PATENT DOCUMENTS 8,077,801 B2  12/2011  Malladi
2008/0232396 A1*  9/2008  Buckley et al. ............... 370/465
(Continued)

FOREIGN PATENT DOCUMENTS

CN  101534473 A  9/2009
EP  1734684 A1  12/2006
(Continued)

OTHER PUBLICATIONS

Alcatel-Lucent., "Signaling o f MBSFN Subframe Allocations", 3GPP Draft,R1-080210_Signalling of MBSFN_Subframe_Allocations,3rd Generation Partnership Project (3GPP), Mobile Competence Centre, 650, Route Des Lucioles, F-06921,Sophia-Antipolis Cedex, France, vol. RAN WG2, no. Sorrento, Italy, Feb. 2, 2008,XP050138492 [retrieved on Feb. 2, 2008] p. 1, paragraph 1-paragraph 3.
(Continued)

*Primary Examiner* — Jamal Javaid
*Assistant Examiner* — Wali Butt
(74) *Attorney, Agent, or Firm* — Novak Druce Connolly Bove + Quigg LLP

(57) ABSTRACT

Techniques are provided for single carrier optimization. For example, there is provided a method that involves, in a subframe of a radio spectrum, allocating a first set of resource elements (REs) for multimedia broadcast over a single frequency network (MBSFN) transmissions, each symbol corresponding to each RE of the first set having a first cyclic prefix (CP) type. The method may involve allocating a second set of REs for unicast transmissions, each symbol corresponding to each RE of second set having a second CP type. The method may involve determining whether the first CP type and the second CP type are the same. The method may involve, in response to the first CP type and the second CP type being the same, combining the MBSFN transmissions and the unicast transmissions in the subframe according to the allocated first and second sets of REs.

41 Claims, 16 Drawing Sheets

(52) U.S. Cl.
CPC ............ *H04L5/0044* (2013.01); *H04L 5/0048* (2013.01); *H04L 5/0053* (2013.01); *H04L 5/0055* (2013.01); *H04L 5/0007* (2013.01); *H04L 5/0058* (2013.01); *H04L 5/0073* (2013.01)

(56) References Cited

U.S. PATENT DOCUMENTS

| | | | |
|---|---|---|---|
| 2008/0267317 A1* | 10/2008 | Malladi ......................... | 375/299 |
| 2009/0252077 A1* | 10/2009 | Khandekar et al. ........... | 370/312 |
| 2009/0257371 A1 | 10/2009 | Nishio | |
| 2010/0034163 A1 | 2/2010 | Damnjanovic et al. | |
| 2010/0080159 A1 | 4/2010 | Hu et al. | |
| 2010/0105366 A1 | 4/2010 | Zhao et al. | |
| 2010/0157872 A1 | 6/2010 | Hyun et al. | |
| 2010/0157919 A1 | 6/2010 | Koskinen | |
| 2010/0329171 A1 | 12/2010 | Kuo et al. | |
| 2011/0013554 A1 | 1/2011 | Koskinen | |
| 2011/0023522 A1 | 2/2011 | Hsu | |
| 2011/0026522 A1 | 2/2011 | Hsu | |
| 2011/0076962 A1 | 3/2011 | Chen et al. | |
| 2011/0103286 A1 | 5/2011 | Montojo et al. | |
| 2011/0103288 A1 | 5/2011 | Lee et al. | |
| 2011/0103366 A1* | 5/2011 | Morimoto et al. ............ | 370/344 |
| 2011/0243056 A1 | 10/2011 | Jen | |
| 2011/0268008 A1 | 11/2011 | Kim et al. | |
| 2011/0280223 A1 | 11/2011 | Maeda et al. | |
| 2011/0305183 A1 | 12/2011 | Hsu et al. | |
| 2012/0213130 A1 | 8/2012 | Zhang et al. | |
| 2013/0188531 A1* | 7/2013 | Zhang ........................... | 370/280 |

FOREIGN PATENT DOCUMENTS

| | | |
|---|---|---|
| EP | 2328314 A1 | 6/2011 |
| EP | 2426957 A1 | 3/2012 |
| JP | 2010516066 A | 5/2010 |
| JP | 2010518731 A | 5/2010 |
| KR | 20090101310 A | 9/2009 |
| WO | 2008084634 A1 | 7/2008 |
| WO | 2008086461 A2 | 7/2008 |
| WO | 2008100116 A1 | 8/2008 |
| WO | 2008118064 A2 | 10/2008 |
| WO | 2009118640 A1 | 10/2009 |
| WO | 2010020134 A1 | 2/2010 |
| WO | 2010032850 A1 | 3/2010 |
| WO | 2010098581 A2 | 9/2010 |
| WO | 2010124415 A1 | 11/2010 |

OTHER PUBLICATIONS

HTC.,"MBMS in Carrier Aggregation", 3GPP Draft; R2-102357 LTE-A MBMS in CA DISC, 3rd Generation Partnership Project (3GPP), Mobile Competence Centre; 650, Route Des Lucioles; F-06921 Sophia-Antipolis Cedex; France, vol. RAN WG2, no. Beijing, china; 20100412, Apr. 6, 2010, XP050422649 [retrieved on Apr. 6, 2010].

International Search Report and Written Opinion—PCT/US2012/026184—ISA/EPO—Sep. 6, 2012.

LTE: Evolved Universal Terrestrial Radio Access (E-UTRA), Radio Resource Control (RRC), Protocol specification (3GPP TS 36.331 version 10.0.0 Release 10), Technical Specification, European Telecommunications Standards Institute (ETSI) , 650, Route Des Lucioles; F-06921, Sophia-Antipolis, France, vol. 3GPP RAN 2, No. V10.0.0, Jan. 1, 2011, XP014062152.

Mediatek.,"Acquisition of MBMS parameters", 3GPP DRAFT, R2-104435, 3rd Generation Partnership Project (3GPP), Mobile Competence Centre, 650, Route Des Lucioles, F-06921 Sophia-Anti Polis Cedex, France, vol. RAN WG2, no. Madrid, Spain, 20100823, Aug. 17, 2010, XP050451857, [retrieved on Aug. 17, 2010].

Partial International Search Report—PCT/US2012/026184—ISA/EPO—Jun. 4, 2012.

Non-Final Office Action for U.S. Appl. No. 13/402,845, Jul. 9, 2014, pp. 1-36.

European Search Report—EP14192540—Search Authority—Munich—Jan. 21, 2015.

IPWireless Inc., "New SI proposal: Feasibility Study of Dedicated Carrier Operation in LTE MBMS", 3GPP TSG-RAN#48 RP-100575, 6 pages, Internet <URL: http://www.3gpp.org/ftp/tsg_ran/TSG_RAN/TSGR_48/Docs/RP-100575. zip>, May 27, 2010.

"3rd Generation Partnership Project; Technical Specification Group Radio Access Network; Evolved Universal Terrestrial Radio Access (E-UTRA); Radio Resource Control (RRC); Protocol specification (Release 10)", 3GPP Standard; 3GPP TS 36.331, 3rd Generation Partnership Project (3GPP), Mobile Competence Centre ; 650, Route Des Lucioles ; F-06921 Sophia-Antipolis Cedex ; France, No. V10.0.0, Dec. 19, 2010 pp. 1-276, XP050462133, [retrieved on Dec. 19, 2010] paragraphs [5.3.3.1], [5.3.4.1].

* cited by examiner

SYSTEM AND METHOD FOR SINGLE CARRIER OPTIMIZATION FOR EVOLVED MULTIMEDIA BROADCAST MULTICAST SERVICE

CROSS-REFERENCE TO RELATED APPLICATION

The present Application for Patent claims priority to Provisional Application No. 61/445,983, filed Feb. 23, 2011, entitled "SYSTEM AND METHOD FOR SINGLE CARRIER OPTIMIZATION FOR EVOLVED MULTIMEDIA BROADCAST MULTICAST SERVICE", and is assigned to the assignee hereof, and is hereby expressly incorporated in its entirety by reference herein.

BACKGROUND

1. Field

Aspects of the present disclosure relate generally to wireless communication systems, and more particularly, to single carrier enhancements for evolved Multimedia Broadcast Multicast Service (eMBMS).

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of network entities, such as base stations, that can support communication for a number of mobile entities/devices, such as, for example, user equipments (UEs) or access terminals (ATs). A mobile entity may communicate with a base station via a downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved NodeBs (eNBs), and mobile entities, such as UEs.

One mechanism to facilitate high bandwidth communication for multimedia has been single frequency network (SFN) operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit bi-directional information in a synchronized manner, so that signals reinforce one another rather than interfere with each other. In the context of eMBMS, there remains a need for single carrier optimization for transmitting shared content from a LTE network to multiple UEs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the embodiments described herein, there is provided a method for single carrier optimization for evolved Multimedia Broadcast Multicast Service (eMBMS) by at least one network entity, such as, for example, an evolved NodeB (eNB). The method may involve, in a subframe of a radio spectrum, allocating a first set of resource elements (REs) for multimedia broadcast over a single frequency network (MBSFN) transmissions, each symbol corresponding to each RE of the first set having a first cyclic prefix (CP) type. The method may also involve allocating a second set of REs for unicast transmissions, each symbol corresponding to each RE of second set having a second CP type. The method may further involve determining whether the first CP type and the second CP type are the same. The method may still further involve, in response to the first CP type and the second CP type being the same, combining the MBSFN transmissions and the unicast transmissions in the subframe according to the allocated first and second sets of REs. In related aspects, an electronic device (e.g., an eNB or component(s) thereof) may be configured to execute the above-described methodology.

In accordance with one or more aspects of the embodiments described herein, a method is provided for single carrier optimization for eMBMS, wherein the method may be performed by a given network entity, such as, for example, an eNB. The method may involve, identifying a single frequency network (SFN) as a multiple paging network, the SFN having a defined number of available subframes. The method may further involve moving paging information into a subset of the available subframes. In related aspects, an electronic device (e.g., an eNB or component(s) thereof) may be configured to execute the above-described methodology.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
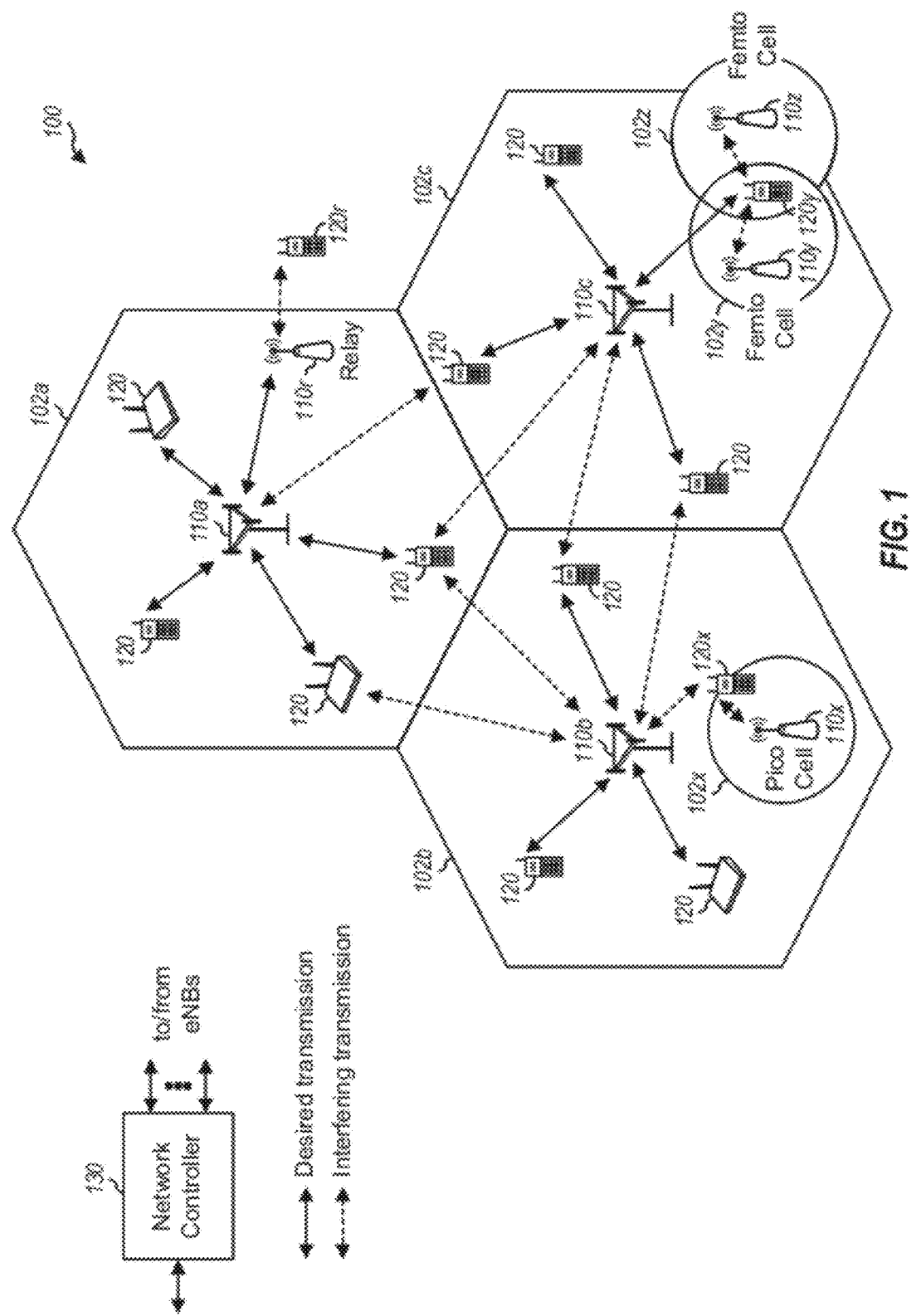
FIG. 1 is a block diagram conceptually illustrating an example of a telecommunications system.

FIG. 1 shows a wireless communication network 100, which may be an LTE network. The wireless network 100 may include a number of evolved NodeBs (eNBs) 110 and other network entities. An eNB may be a station that communicates with the UEs and may also be referred to as a base station, a NodeB, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
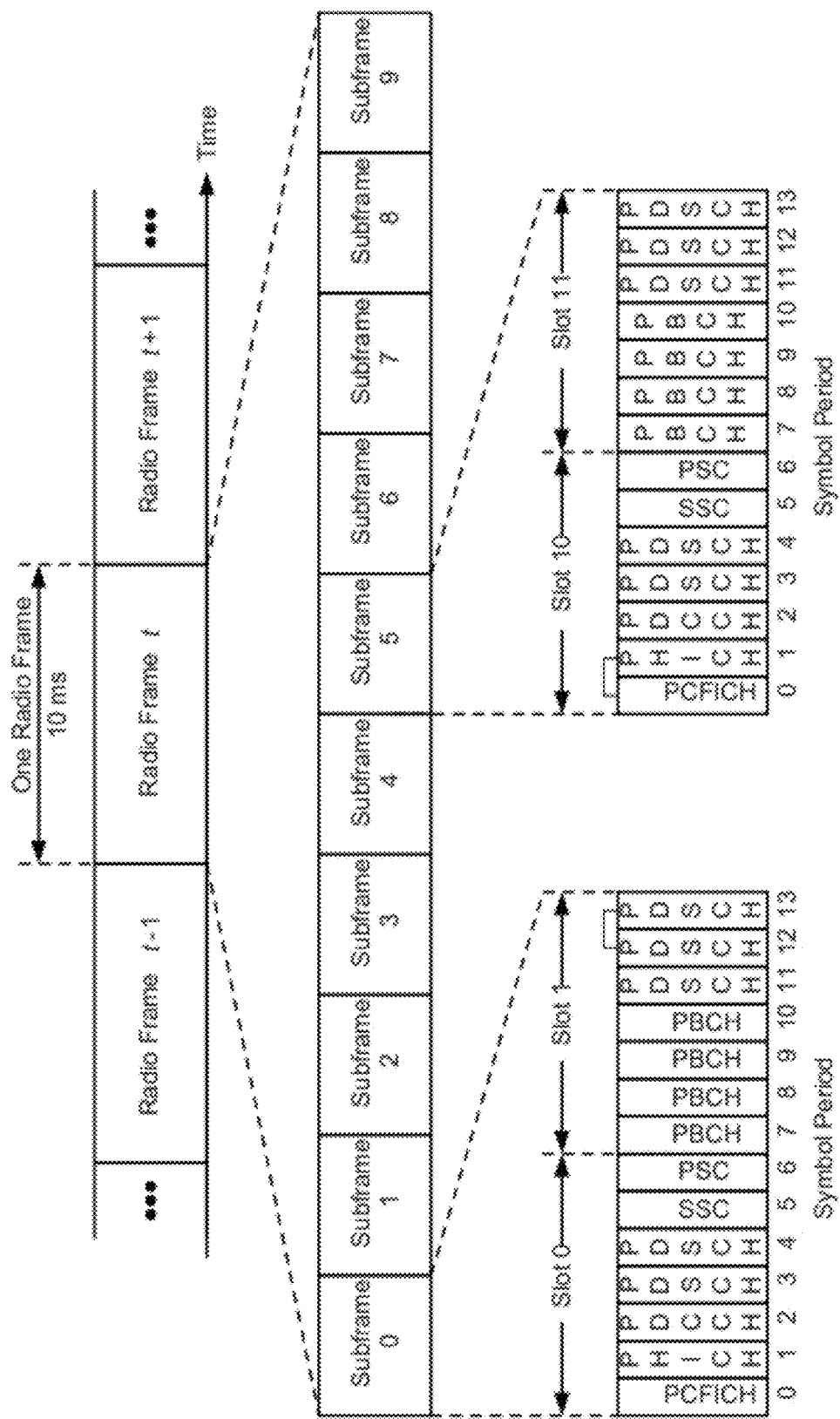
FIG. 2 is a block diagram conceptually illustrating an example of a downlink frame structure in a telecommunications system.

FIG. 2 shows a downlink frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each subframe may be assigned indices of 0 through 2L−1. The available time frequency resources may be partitioned into resource blocks (RBs). Each RB may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 RBs. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels.

Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available. In related aspects, the Physical Multicast Channel (PMCH) is the physical channel that carries the Multicast Channel (MCH) transport channel. The PMCH is similar to the PDSCH except that it carries information to multiple users for point-to-multipoint services. For example, the PMCH may use Quadrature Phase Shift Keying (QPSK), 160 AM or 640 AM modulation. The MCH is a transport channel used to transmit Multicast Control Channel (MCCH) information to set up multicast transmissions, wherein MCCH is a control channel used for information needed for multicast reception.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements (REs) may be available in each symbol period. Each RE may cover one subcarrier in one symbol period and may be used to send one modulation symbol, which may be a real or complex value. REs not used for a reference signal (RS) in each symbol period may be arranged into RE groups (REGs). Each REG may include four REs in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
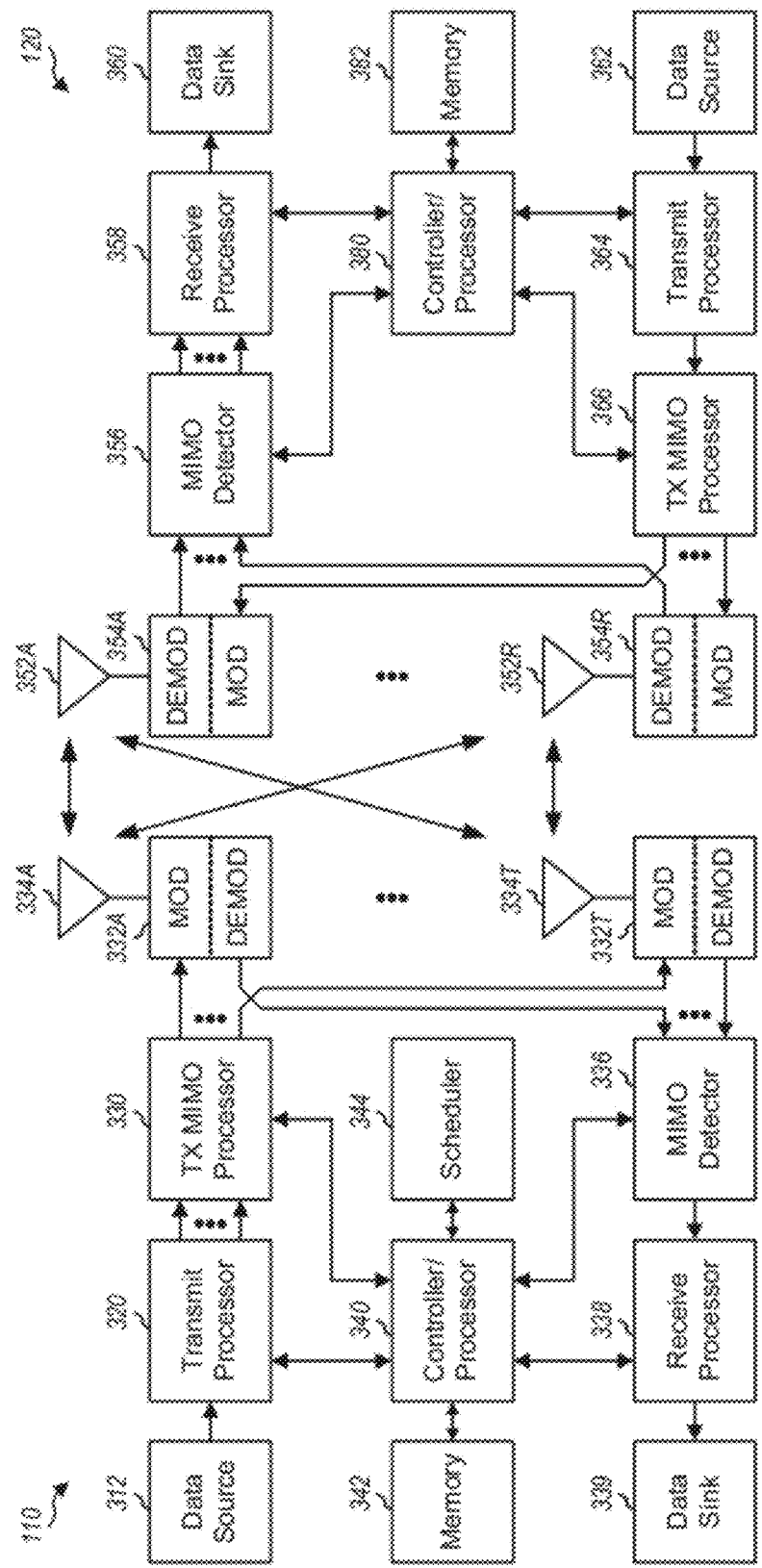
FIG. 3 is a block diagram conceptually illustrating is a block diagram conceptually illustrating a design of a network entity and a mobile entity configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type.

The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific RS. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332*a* through 332*t* may be transmitted via the antennas 334*a* through 334*t*, respectively.

At the UE 120, the antennas 352*a* through 352*r* may receive the downlink signals from the base station 110 and may provide received signals to the demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354*a* through 354*r*, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a RS. The symbols from the transmit processor 364 may be precoded by a TX MIMO processor 366 if applicable, further processed by the modulators 354*a* through 354*r* (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, the UE 120 for wireless communication includes means for detecting interference from an interfering base station during a connection mode of the UE, means for selecting a yielded resource of the interfering base station, means for obtaining an error rate of a physical downlink control channel on the yielded resource, and means, executable in response to the error rate exceeding a predetermined level, for declaring a radio link failure. In one aspect, the aforementioned means may be the processor(s), the controller/processor 380, the memory 382, the receive processor 358, the MIMO detector 356, the demodulators 354*a*, and the antennas 352*a* configured to perform the functions recited by the aforementioned means. In another aspect, the aforementioned means may be a module or any apparatus configured to perform the functions recited by the aforementioned means.

CARRIER AGGREGATION: LTE-Advanced UEs use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric frequency division duplex (FDD) assignments will conserve spectrum and are a good fit for the typically asymmetric bandwidth utilization by broadband subscribers.

Figure 4A:
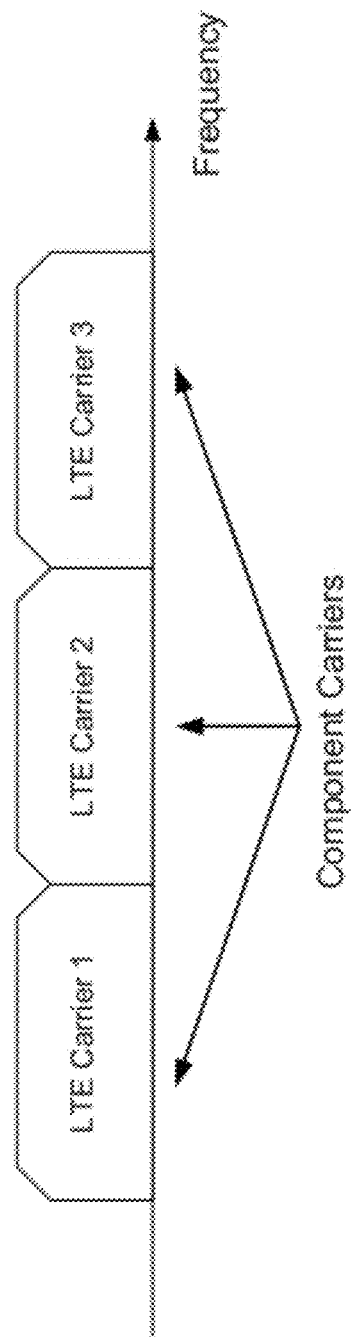
FIG. 4A discloses a continuous carrier aggregation type.
Figure 4B:
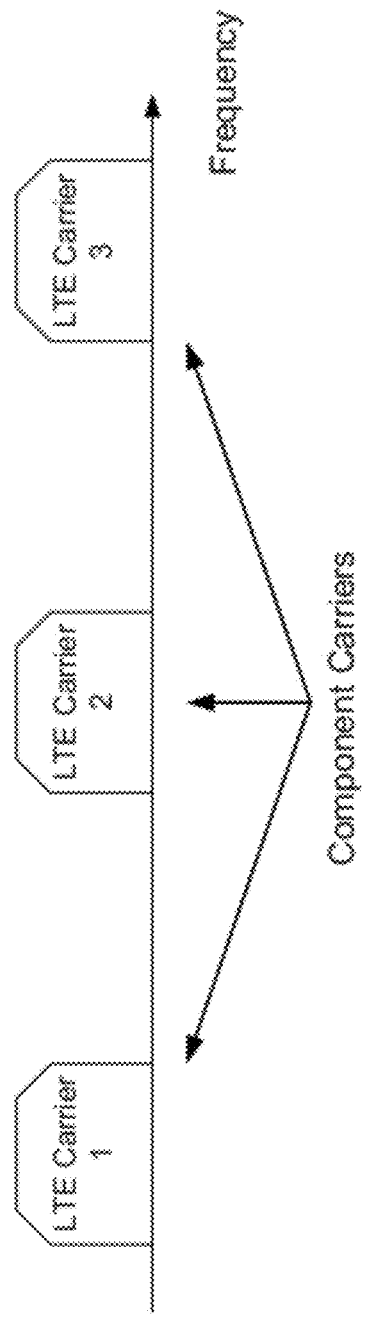
FIG. 4B discloses a non-continuous carrier aggregation type.

CARRIER AGGREGATION TYPES: For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Figure 5:
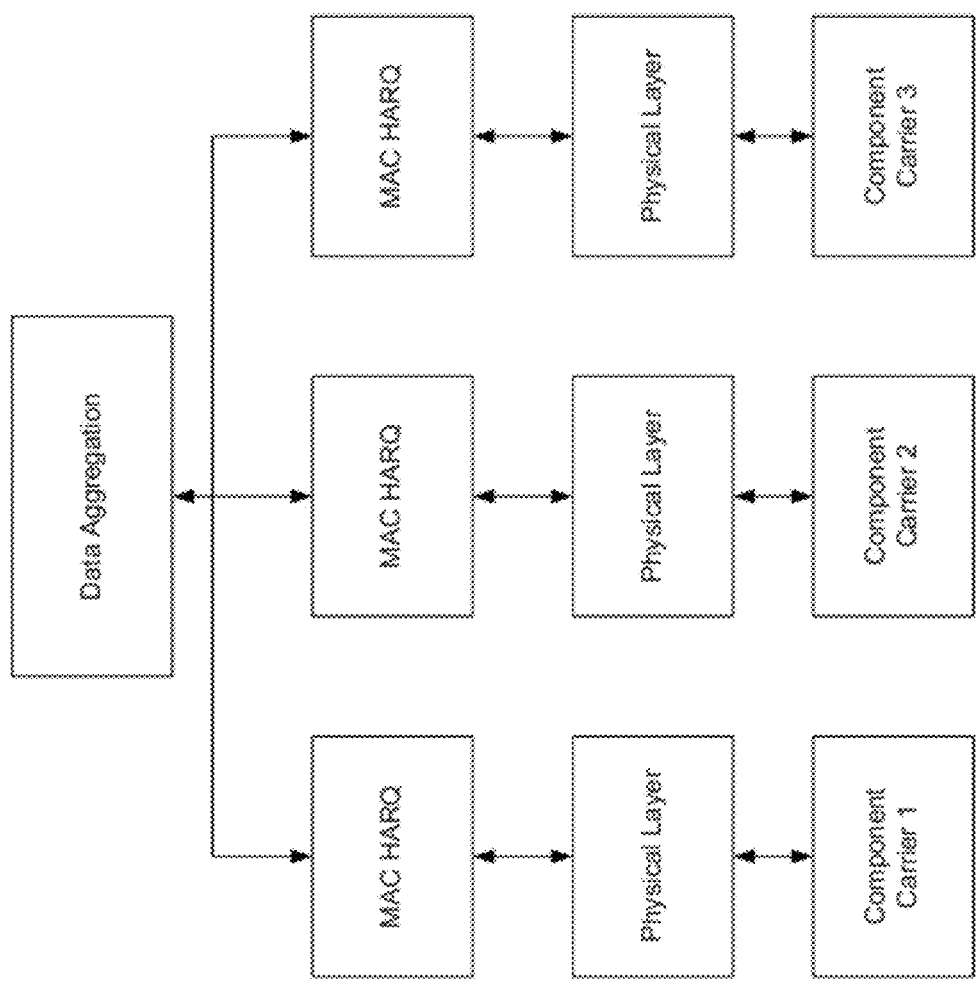
FIG. 5 discloses MAC layer data aggregation.

DATA AGGREGATION SCHEMES: FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

CONTROL SIGNALING: In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

HANDOVER CONTROL: It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNB. The reason is that the channel conditions of two (or more) adjacent cells (e.g., eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

In accordance with aspects of the subject of this disclosure, there is provided a wireless network (e.g., a 3GPP network) having features relating to single carrier optimization for evolved Multimedia Broadcast Multicast Service (eMBMS). eMBMS provides an efficient way to transmit shared content from an LTE network to multiple mobile entities, such as, for example, user equipments (UEs).

With respect a physical layer (PHY) of eMBMS for LTE FDD, the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as multimedia broadcast single frequency network (MBSFN) subframes, can be reserved for eMBMS transmission. As such current eMBMS design allows at most six out of ten subframes for eMBMS.

Figure 6:
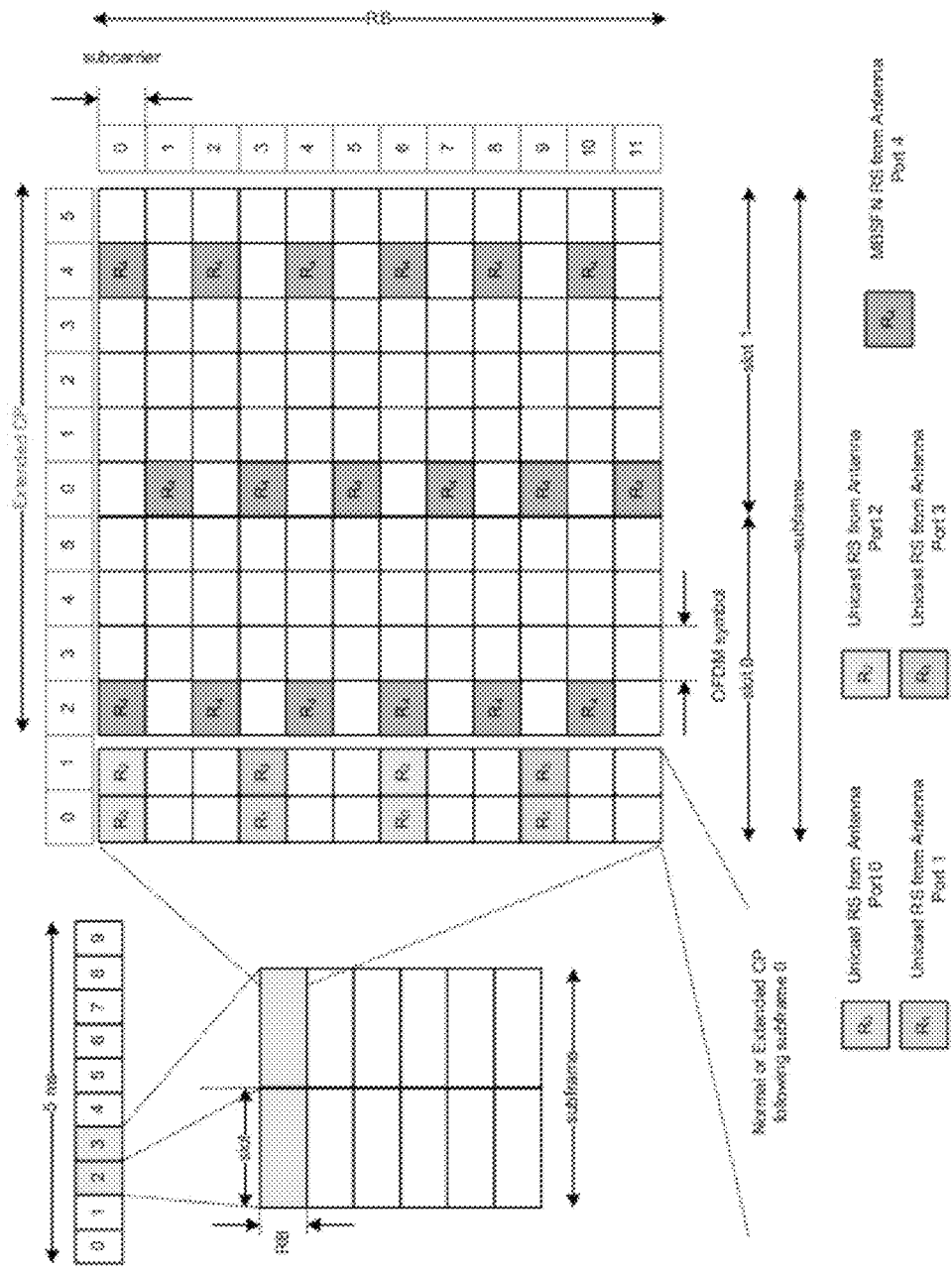
FIG. 6 illustrates an existing allocation of MBSFN reference signals on MBSFN subframes.

With reference to FIG. 6, which shows an existing allocation of MBSFN reference signals on MBSFN subframes, if the subframes are labeled 0, 1, 2, 3, 4, 5, 6, 7, 8, and 9, then subframes 0, 4, 5, and 9 may be excluded from eMBMS in FDD. Also, subframes 0, 1, 5, and 6 may be excluded from eMBMS in time division duplex (TDD). More specifically, in FDD, subframes 0, 4, 5, and 9 may be used for PSS/SSS/PBCH/paging/system information blocks (SIBs) and unicast service, whereas subframes 1, 2, 3, 6, 7, and 8 may be configured as MBSFN subframes.

Figure 7:
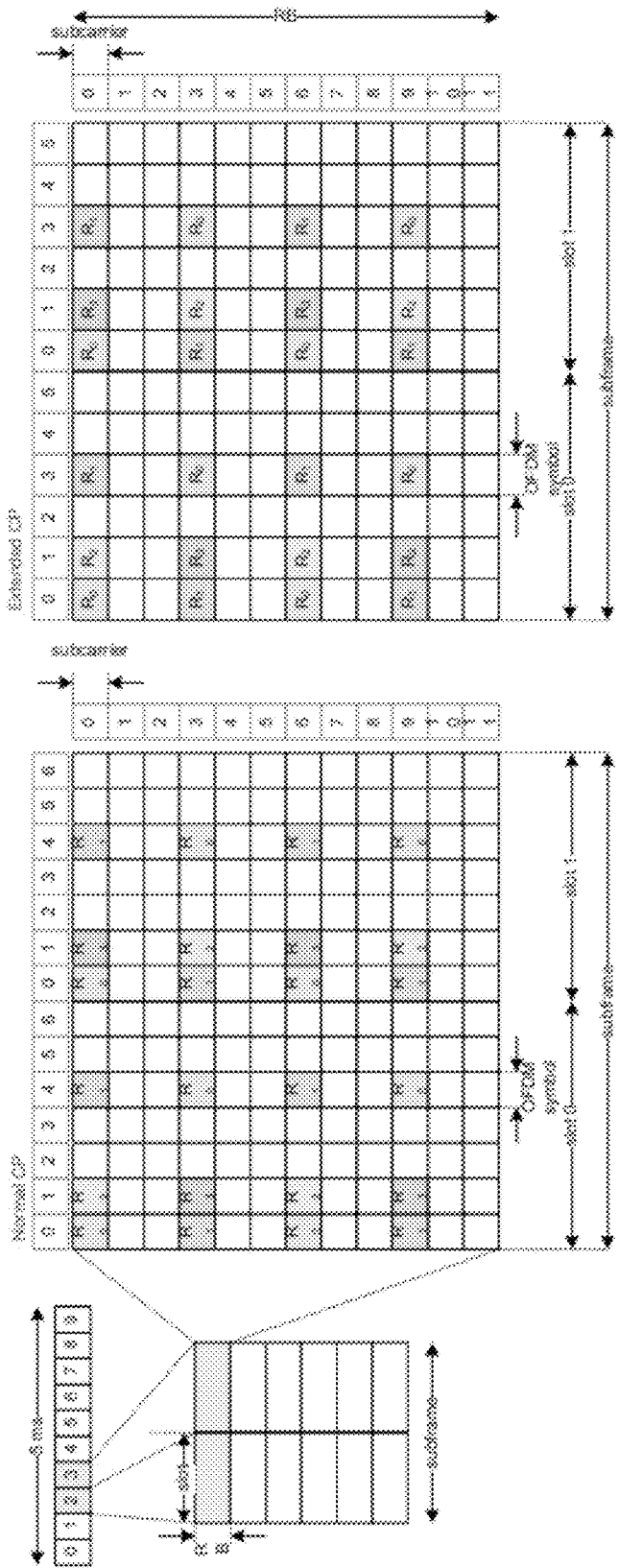
FIG. 7 illustrates an existing allocation of unicast reference signals on non-MBSFN subframes.

With continued reference to FIG. 6, within each MBSFN subframe, the first 1 or 2 symbols may be used for unicast RSs and control signaling. A cyclic prefix (CP) length of the first 1 or 2 symbols may follow that of subframe 0. A transmission gap may be between the first 1 or 2 symbols and the MBSFN symbols if the CP lengths are different. In related aspects, the overall MBSFN bandwidth utilization may be 42.5% considering RS overhead (e.g., 6 MBSFN subframes and 2 control symbols within each MBSFN subframe). Known techniques for providing MBSFN RSs and unicast RSs typically involve allocating the MBSFN RSs on MBSFN subframes (as shown in FIG. 6), and allocating partial unicast RSs on non-MBSFN subframes where such partial unicast RSs exist in the first 1 or 2 symbols for unicast control signaling. More specifically, as FIG. 6 shows, the extended CP of the MBSFN subframe includes MBSFN RSs in the last 10 symbols but only partial unicast RSs in the first 1 or 2 symbols. In further related aspects, the unicast RSs may be on the non-MBSFN subframes, as illustrated in FIG. 7, which shows an existing allocation of unicast reference signals on non-MBSFN subframes. As FIG. 7 shows, the normal CP and/or extended CP of the non-MBSFN subframes include unicast RSs but not MBSFN RSs.

In accordance with one or more aspects of the embodiments described herein, there are provided techniques for enhancing the above-described eMBMS/MBSFN design to increase transmission opportunity. For example, the current eMBMS design may be extended so that subframe 0/4/5/9 or 0/1/5/6 can also be used for eMBMS. To preserve backward compatibility, the enhancements should not have impact on the PSS/SSS/PBCH, the SIB(s), paging, or radio link monitoring (RLM)/radio resource management (RRM).

In one approach, the PSS/SSS/PBCH may be kept untouched. In the alternative, or in addition, the control region may be kept untouched in the subframes. In the alternative, or in addition, the RBs for SIB(s) and paging may be untouched. For example, the cells in the eMBMS have the same SIB(s), paging time, and frequency location. In another example, the union of the RBs used for SIB(s) and paging across all cells in the eMBMS may be kept untouched.

Figure 8:
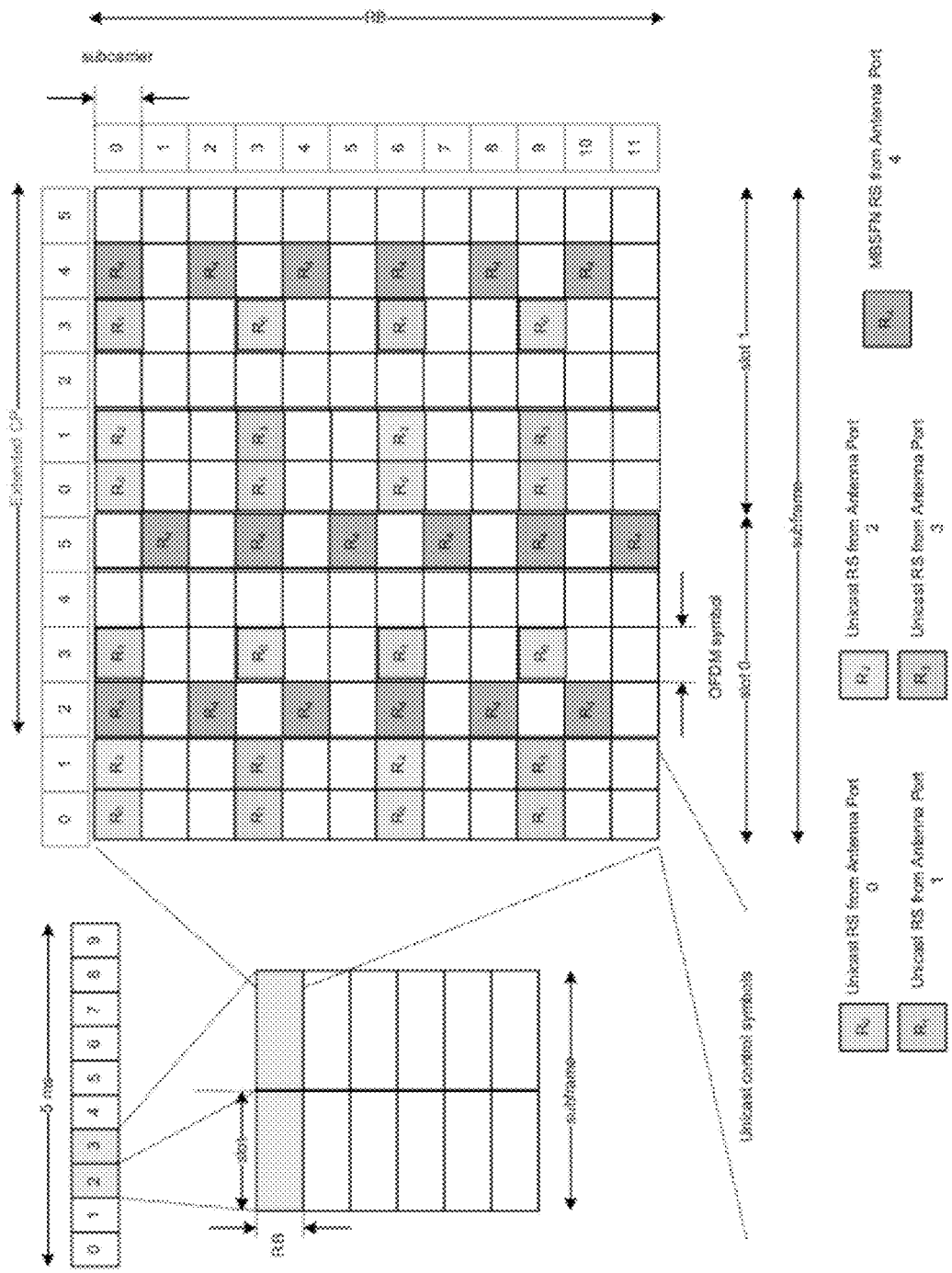
FIG. 8 illustrates an embodiment of MBSFN reference signal allocation for single carrier optimization.

In contrast to the known signal allocation techniques that involve multiple carriers as shown in FIGS. 6-7 and described above, FIG. 8 illustrates an improved signal allocation technique that achieves single carrier optimization. With the signal allocation technique of FIG. 8, it is possible to include both MBSFN RSs and full unicast RSs on a given subframe, without the need for separate MBSFN subframes and non-MBSFN subframes. With continued reference to FIG. 8, to keep backward compatibility on unicast channel estimation and the RLM/RRM, the cells may transmit cell-specific reference signals (CRSs), and the OFDM symbols containing CRSs may be blanked out for MBSFN transmission. For example, the MBSFN RS on symbol 6 (i.e., the second symbol 0) may be shifted to symbol 5, since symbol 6 contains CRSs. Accordingly, the MBSFN RSs may be transmitted on subframes 0/4/5/9, as illustrated in the embodiment of FIG. 8. It is noted that both the unicast and eMBMS subframes should have the same CP type for this approach to work.

In yet another approach, the CRS may be transmitted on the RBs used for PBCH, SIB(s), paging, and/or the like. Both the unicast and eMBMS subframes should have the same CP type for this alternative approach to work.

In still another approach, a transmit time interval (TTI) or subframe in an LTE network may be extended. For example, a virtual extended TTI may be implemented via outer coding in the upper layer. It is noted that a large latency may be associated with outer coding. In another example, Layer 1 (L1) extended TTI may be implemented to benefit from time diversity. It is noted that there may be a large latency and buffer requirement on the receiver with L1 extended TTI. In a further approach, frequency division multiplexing (FDM) of a different eMBMS service may be implemented in addition to TDM, resulting in a higher granularity of service multiplexing.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 9:
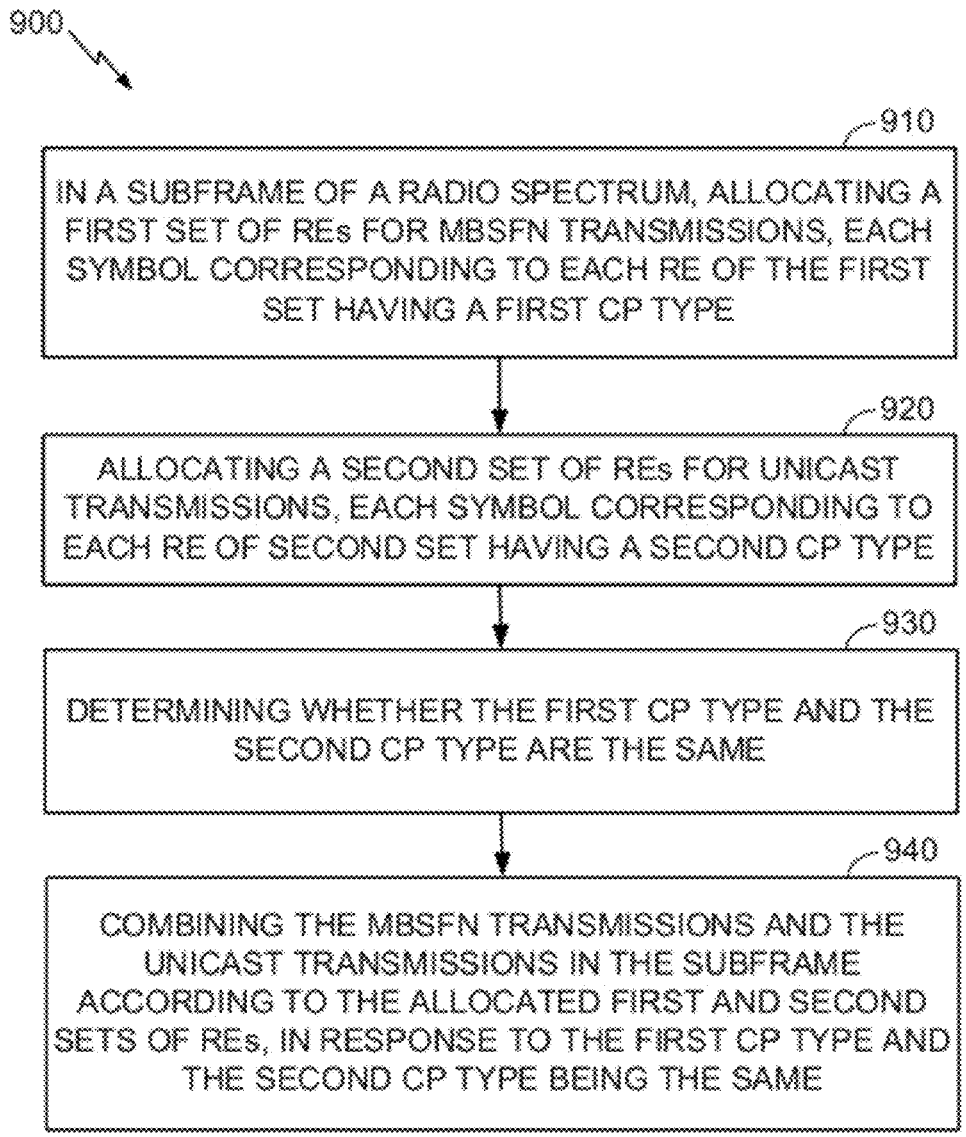
FIG. 9 illustrates an embodiment of a methodology for single carrier optimization, performed at a network entity.

In accordance with one or more aspects of the embodiments described herein, there are provided methods for single carrier optimization for eMBMS. With reference to FIG. 9, illustrated is a methodology 900 that may be performed at a network entity, such as, for example, an eNB or the like. The method 900 may involve, at 910, in a subframe of a radio spectrum, allocating a first set of REs for MBSFN transmissions, each symbol corresponding to each RE of the first set having a first CP type. The method 900 may involve, at 920, allocating a second set of REs for unicast transmissions, each symbol corresponding to each RE of second set having a second CP type. The method 900 may involve, at 930, determining whether the first CP type and the second CP type are the same. The method 900 may involve, at 940, combining the MBSFN transmissions and the unicast transmissions in the subframe according to the allocated first and second sets of REs, in response to the first CP type and the second CP type being the same.

Figure 10:
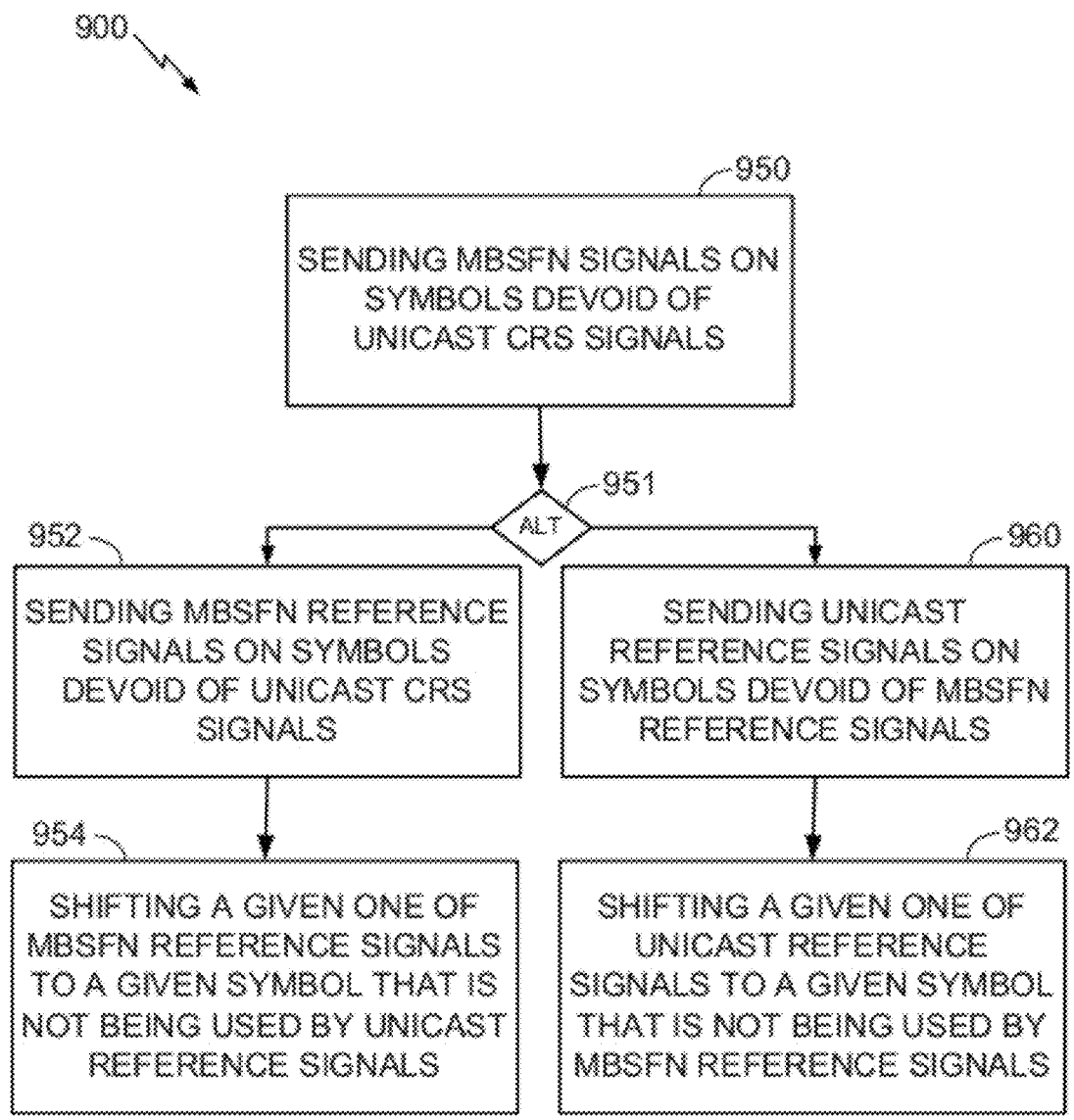
FIGS. 10-11B show further aspects of the methodology of FIG. 9.

With reference to FIG. 10, there are shown further operations or aspects of method 900 that are optional and may be performed by a network entity for single carrier optimization of eMBMs. It is noted that the blocks shown in FIGS. 10-11B are not required to perform the method 900. It is further noted that a lower block that is directly downstream of an upper block (i.e., labeled with a higher block number and not separated from the upper block by an "in the alternative" diamond) is dependent on the upper block (i.e., does not occur unless the upper block occurs). If the method 900 includes at least one block of FIGS. 10-11B, then the method 900 may terminate after the at least one block, without necessarily having to include any subsequent downstream block(s) that may be illustrated. For example, combining the MBSFN transmissions and the unicast transmissions at block 940 may involve, at 950, sending MBSFN signals on symbols devoid of (i.e., not having or including) unicast CRS signals, thereby avoiding the use of CRSs) for MBSFN transmissions. The method 900 may further involve, at 952, sending MBSFN reference signals on symbols devoid of unicast CRS signals. The method 900 may also involve, at 954, shifting a given one of MBSFN reference signals to a given symbol that is not being used by unicast reference signals.

Conversely, in the alternative 951 to block 952, the method 900 may involve, at 960, sending unicast reference signals on symbols devoid (i.e., not having or including) of MBSFN reference signals. The method 900 may further involve, at 962, shifting a given one of unicast reference signals to a given symbol that is not being used by MBSFN reference signals.

Figure 11A:
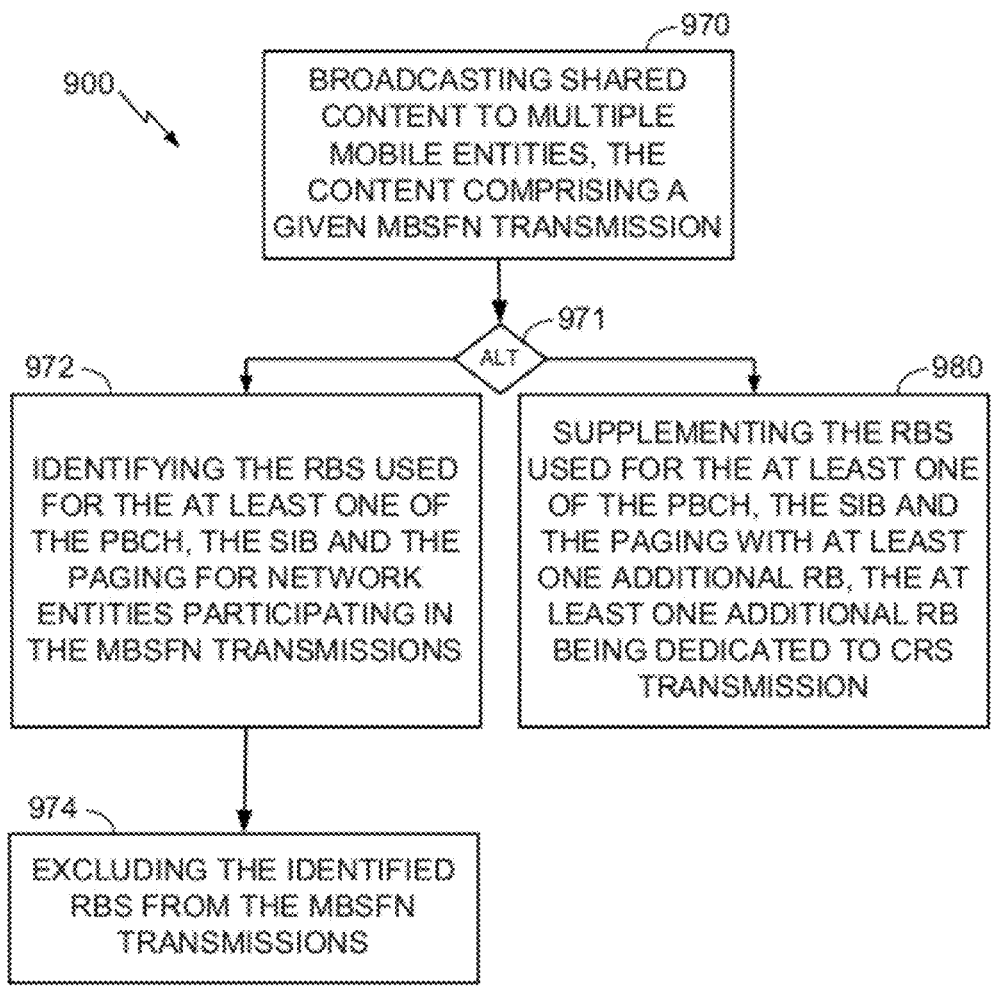
Figure 11B:
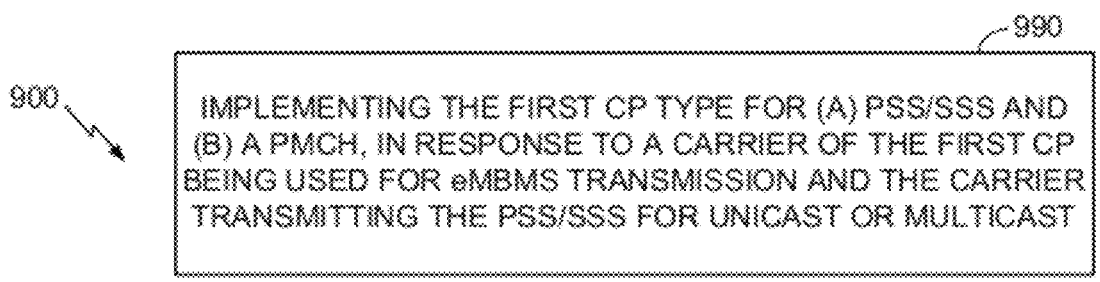

FIG. 11A shows further operations or aspects of method 900 that are optional and may be performed by a network entity. For example, in addition to combining the MBSFN transmissions and the unicast transmissions in the subframe at block 940, the method 900 may involve, at 970, broadcasting shared content to multiple mobile entities, the content comprising a given MBSFN transmission. The method 900 may further involve, at 972, identifying the RBs used for the at least one of the PBCH, the SIB and the paging for network entities participating in the MBSFN transmissions. The method 900 may also involve, at 974, excluding the identified RBs from the MBSFN transmissions.

Conversely, in the alternative 971 to block 972, the method 900 may involve, at 980, supplementing the RBs used for the at least one of the PBCH, the SIB and the paging with at least one additional RB, the at least one additional RB being dedicated to CRS transmission.

In related aspects, with reference to FIG. 11B, the method 900 may further involve, at 990, implementing the first CP type for (a) PSS/SSS and (b) a PMCH, in response to a carrier of the first CP being used for eMBMS transmission and the carrier transmitting the PSS/SSS for unicast or multicast. Using the same CP type for the PSS/SSS and the PMCH allows for improved FDM multiplexing between the PSS/SSS and the PMCH.

Figure 12:
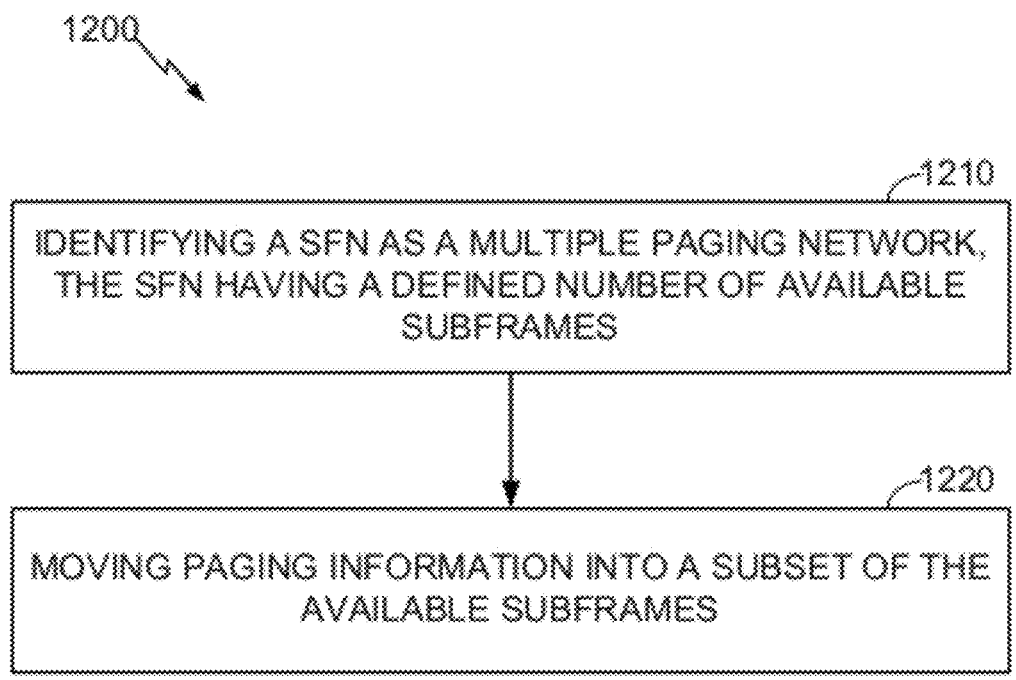
FIG. 12 illustrates another embodiment of a methodology for single carrier optimization, performed at a network entity.

In accordance with one or more aspects of the embodiments described herein, there is provided an alternative methodology for single carrier optimization for eMBMS, as illustrated in FIG. 12. The method 1200 may involve, at 1210, identifying a single frequency network (SFN) as a multiple paging network, the SFN having a defined number of available subframes. The method 1200 may involve, at 1220, moving paging information into a subset of the available subframes.

Figure 13:
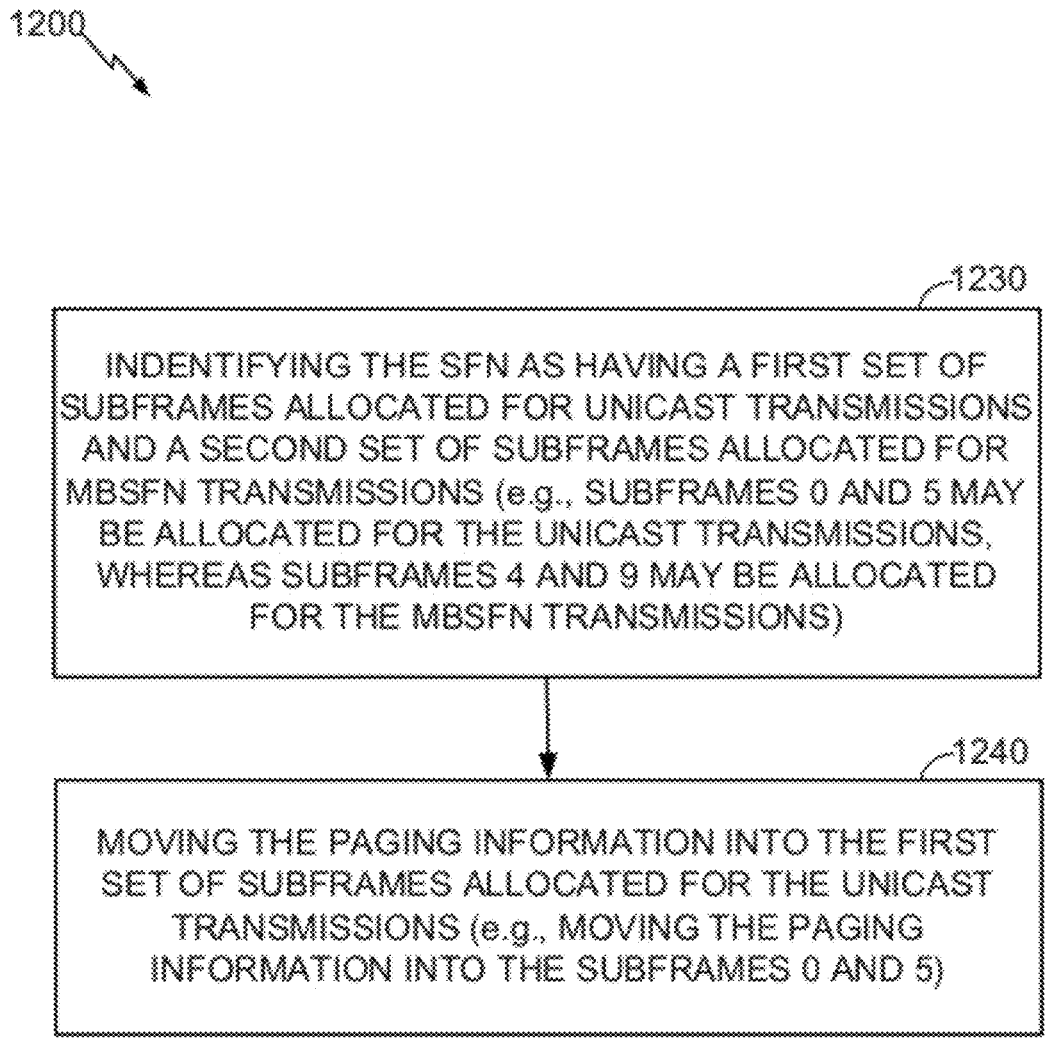
FIG. 13 shows further aspects of the methodology of FIG. 12.

With reference to FIG. 13, there are shown further operations or aspects of method 1200 that are optional and may be performed by a network entity. It is noted that the blocks shown in FIG. 13 are not required to perform the method 1200. It is further noted that a lower block that is directly downstream of an upper block (i.e., labeled with a higher block number and not separated from the upper block by an "in the alternative" diamond) is dependent on the upper block (i.e., does not occur unless the upper block occurs). If the method 1200 includes at least one block of FIG. 13, then the method 1200 may terminate after the at least one block, without necessarily having to include any subsequent downstream block(s) that may be illustrated. For example, identifying the SFN as a multiple paging network at block 1210 may involve, at 1230, identifying the SFN as having a first set of subframes allocated for unicast transmissions and a second set of subframes allocated for Multimedia Broadcast over a Single Frequency Network (MBSFN) transmissions. In addition, moving the paging information at block 1220 may also involve, at 1240, moving the paging information into the first set of subframes allocated for the unicast transmissions. For example, the subframes may be labeled 0, 1, 2, 3, 4, 5, 6, 7, 8, and 9. In related aspects, subframes 0 and 5 may be allocated for the unicast transmissions, whereas subframes 4 and 9 may be allocated for the MBSFN transmissions. In further related aspects, moving may involve moving the paging information into the subframes 0 and 5.

Figure 14:
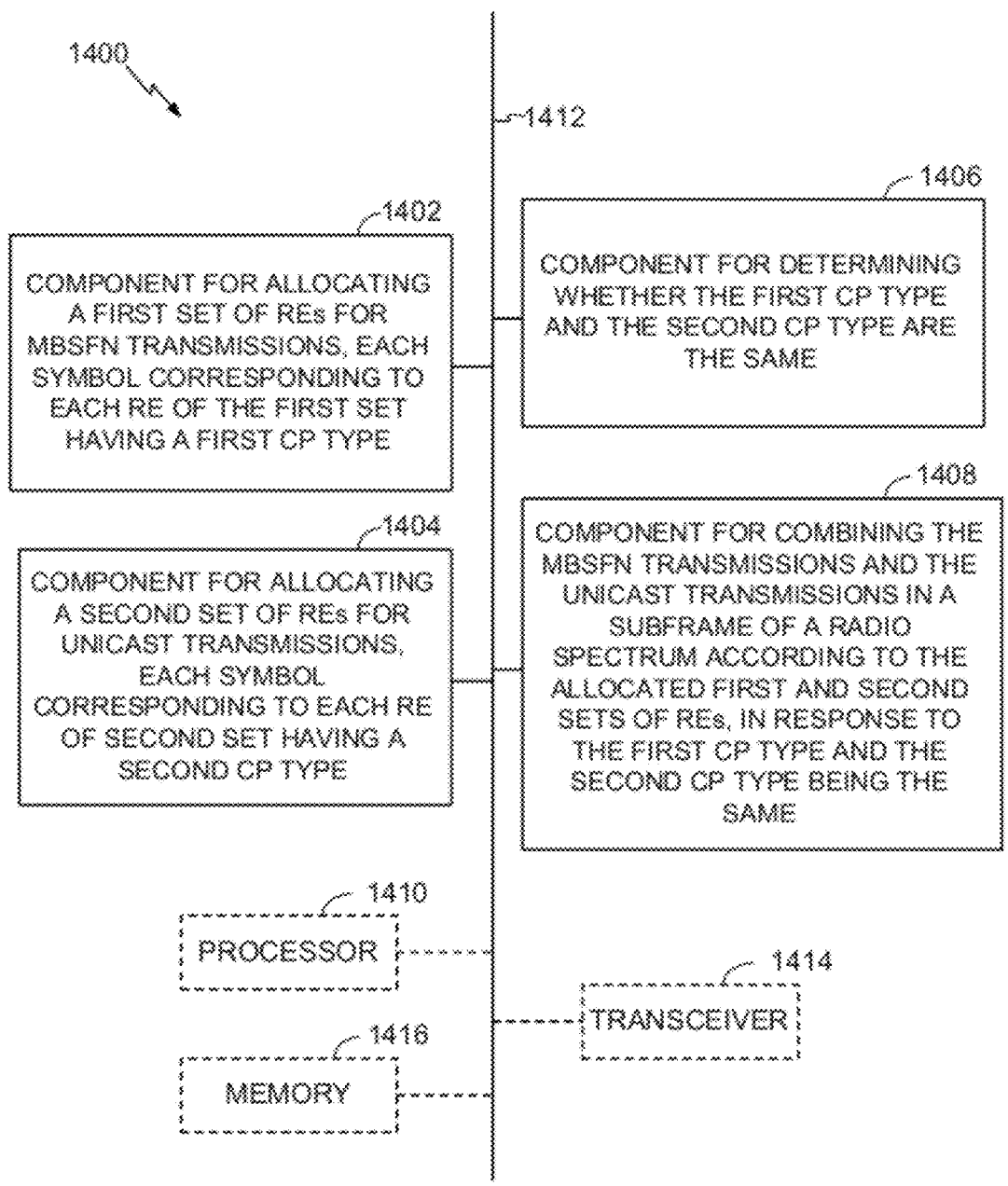
FIG. 14 illustrates an embodiment of an apparatus for single carrier optimization, in accordance with the methodologies of FIGS. 9-11B.

In accordance with one or more aspects of the embodiments described herein, there are provided devices and apparatuses for single carrier optimization for eMBMS, as described above with reference to FIGS. 9-11B. With reference to FIG. 14, there is provided an exemplary apparatus 1400 that may be configured as a network entity (e.g., eNB) in a wireless network, or as a processor or similar device for use within the network entity. The apparatus 1400 may include functional blocks that can represent functions implemented by a processor, software, or combination thereof (e.g., firmware). As illustrated, in one embodiment, the apparatus 1400 may comprise an electrical component or module 1402 for allocating a first set of REs for MBSFN transmissions, each symbol corresponding to each RE of the first set having a first CP type. For example, the electrical component 1402 may include at least one control processor coupled to a network interface or the like and to a memory with instructions for coordinating single carrier optimization for eMBMS or the like. The electrical component 1402 may be, or may include, a means for allocating a first set of REs for MBSFN transmissions, each symbol corresponding to each RE of the first set having a first CP type. Said means may be or may include the at least one control processor (e.g., the controller/processor 340 of FIG. 3) operating an algorithm. The algorithm may include, for example, arranging MBSFN reference signals on subframes in accordance with the embodiment of FIG. 8 or variations thereof.

The apparatus 1400 may comprise an electrical component 1404 for allocating a second set of REs for unicast transmissions, each symbol corresponding to each RE of second set having a second CP type. For example, the electrical component 1404 may include at least one control processor coupled to a network interface or the like and to a memory with instructions for coordinating single carrier optimization for eMBMS or the like. The electrical component 1404 may be, or may include, a means for allocating a second set of REs for unicast transmissions, each symbol corresponding to each RE of second set having a second CP type. Said means may be or may include the at least one control processor (e.g., the controller/processor 340 of FIG. 3) operating an algorithm. The algorithm may include, for example, arranging MBSFN reference signals on subframes in accordance with the embodiment of FIG. 8 or variations thereof.

The apparatus 1400 may comprise an electrical component 1406 for determining whether the first CP type and the second CP type are the same. For example, the electrical component 1406 may include at least one control processor coupled to a network interface or the like and to a memory. The electrical component 1406 may be, or may include, a means for comparing the first and second CP types, as well as a means for determining whether the first and second CP types are the same.

The apparatus 1400 may comprise an electrical component 1408 for combining the MBSFN transmissions and the unicast transmissions in a subframe of a radio spectrum according to the allocated first and second sets of REs, in response to the first CP type and the second CP type being the same. For example, the electrical component 1408 may include at least one control processor coupled to a network interface or the like and to a memory with instructions for coordinating single carrier optimization for eMBMS or the like. The electrical component 1408 may be, or may include, a means for combining the MBSFN transmissions and the unicast transmissions in a subframe of a radio spectrum according to the allocated first and second sets of REs, in response to the first CP type and the second CP type being the same. Said means may be or may include the at least one control processor (e.g., the controller/processor 340 of FIG. 3) operating an algorithm. The algorithm may include, for example, arranging MBSFN reference signals on subframes in accordance with the embodiment of FIG. 8. In the alternative, or in addition, the algorithm may include, for example: sending MBSFN signals on symbols devoid of unicast CRS; sending MBSFN reference signals on symbols devoid of unicast CRS signals; and shifting a given one of MBSFN reference signals to a given symbol that is not being used by unicast reference signals. In the alternative, or in addition, the algorithm may include, for example: sending unicast reference signals on symbols devoid of MBSFN reference signals; and shifting a given one of unicast reference signals to a given symbol that is not being used by MBSFN reference signals. In the alternative, or in addition, the algorithm may include, for example: broadcasting shared content to multiple mobile entities, the content comprising a given MBSFN transmission; transmitting CRSs on RBs used for at least one of a PBCH, a SIB, and paging; identifying the RBs used for the at least one of the PBCH, the SIB and the paging for network entities participating in the MBSFN transmissions; and excluding the identified RBs from the MBSFN transmissions. In the alternative, or in addition, the algorithm may include, for example: supplementing the RBs used for the at least one of the PBCH, the SIB and the paging with at least one additional RB, the at least one additional RB being dedicated to CRS transmission. In the alternative, or in addition, the algorithm may include, for example: implementing the first CP type for (a) a PSS or a SSS and (b) a PMCH, in response to a carrier of the first CP being used for eMBMS transmission and the carrier only transmitting the PSS or the SSS for unicast.

In related aspects, the apparatus 1400 may optionally include a processor component 1410 having at least one processor, in the case of the apparatus 1400 configured as a network entity, rather than as a processor. The processor 1410, in such case, may be in operative communication with the components 1402-1408 via a bus 1412 or similar communication coupling. The processor 1410 may effect initiation and scheduling of the processes or functions performed by electrical components 1402-1408.

In further related aspects, the apparatus 1400 may include a radio transceiver component 1414. A stand alone receiver and/or stand alone transmitter may be used in lieu of or in conjunction with the transceiver 1414. The apparatus 1400 may optionally include a component for storing information, such as, for example, a memory device/component 1416. The computer readable medium or the memory component 1416 may be operatively coupled to the other components of the apparatus 1400 via the bus 1412 or the like. The memory component 1416 may be adapted to store computer readable instructions and data for effecting the processes and behavior of the components 1402-1408, and subcomponents thereof, or the processor 1410, or the methods disclosed herein. The memory component 1416 may retain instructions for executing functions associated with the components 1402-1408. While shown as being external to the memory 1416, it is to be understood that the components 1402-1408 can exist within the memory 1416.

Figure 15:
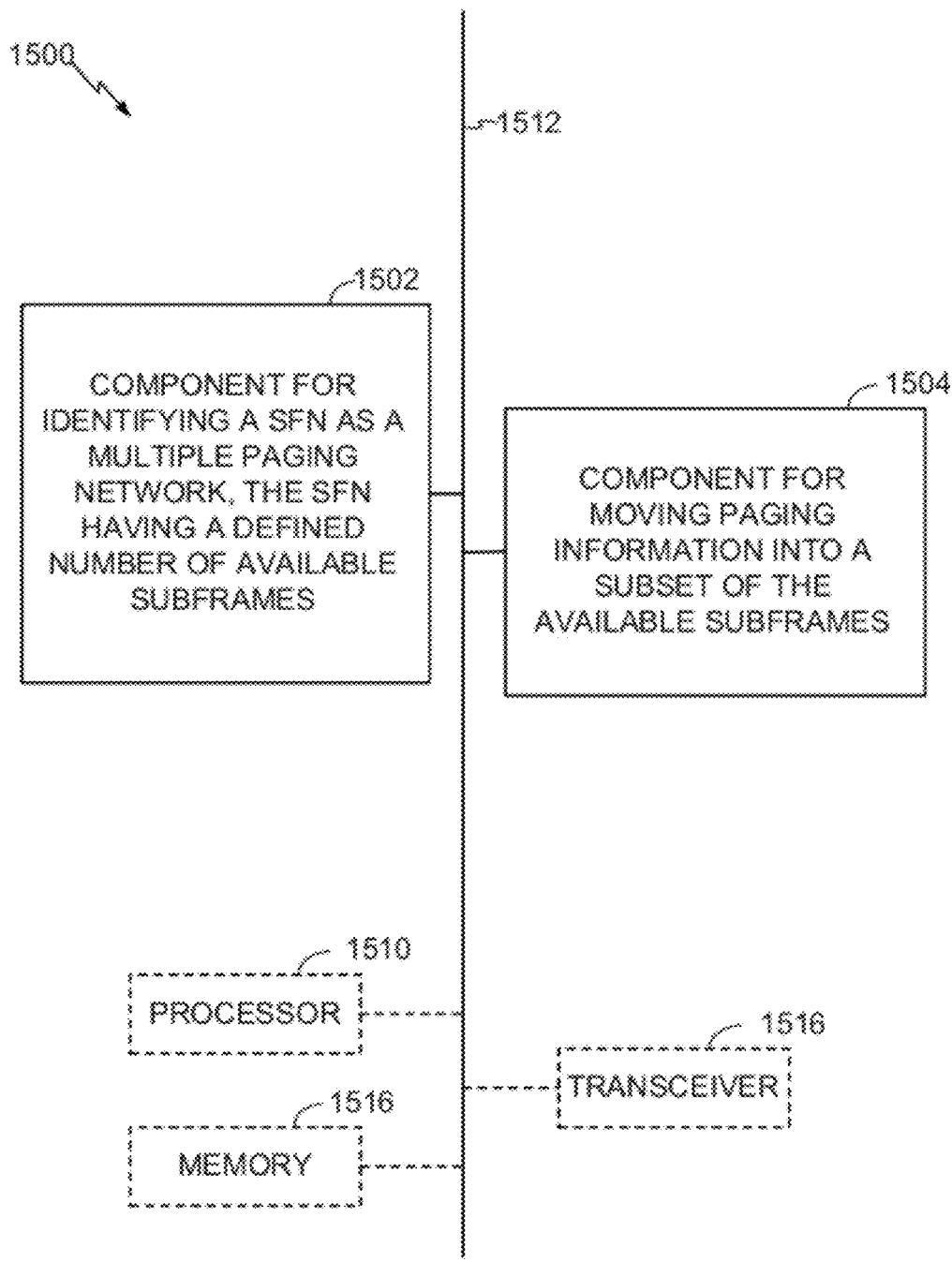
FIG. 15 illustrates another embodiment of an apparatus for single carrier optimization, in accordance with the methodologies of FIGS. 12-13.

In accordance with one or more aspects of the embodiments described herein, there is provided an alternative device/apparatus for single carrier optimization for eMBMS, as described above with reference to FIGS. 12-13. With reference to FIG. 15, there is provided an exemplary apparatus 1500 that may be configured as a network entity, or as a processor or similar device for use within the network entity. As illustrated, in one embodiment, the apparatus 1500 may comprise an electrical component or module 1502 for identifying a SFN as a multiple paging network, the SFN having a defined number of available subframes. For example, the electrical component 1502 may include at least one control processor coupled to a network interface or the like and to a memory with instructions for coordinating single carrier optimization for eMBMS or the like. The electrical component 1502 may be, or may include, a means for identifying a SFN as a multiple paging network, the SFN having a defined number of available subframes. Said means may be or may include the at least one control processor (e.g., the controller/processor 340 of FIG. 3) operating an algorithm. The algorithm may include, for example: identifying the SFN as having a first set of subframes allocated for unicast transmissions and a second set of subframes allocated for MBSFN transmissions; and moving the paging information into the first set of subframes allocated for the unicast transmissions.

The apparatus 1500 may comprise an electrical component 1504 for moving paging information into a subset of the available subframes. For example, the electrical component 1504 may include at least one control processor coupled to a network interface or the like and to a memory with instructions for coordinating single carrier optimization for eMBMS or the like. The electrical component 1504 may be, or may include, a means for moving paging information into a subset of the available subframes. Said means may be or may include the at least one control processor (e.g., the controller/processor 340 of FIG. 3) operating an algorithm. For example, the subframes may be labeled 0, 1, 2, 3, 4, 5, 6, 7, 8, and 9, wherein subframes 0 and 5 may be allocated for the unicast transmissions, and wherein subframes 4 and 9 are allocated for the MBSFN transmissions. Here, the algorithm may include, for example, moving the paging information into the subframes 0 and 5.

For the sake of conciseness, the rest of the details regarding apparatus 1500 are not further elaborated on; however, it is to be understood that the remaining features and aspects of the apparatus 1500 are substantially similar to those described above with respect to apparatus 1400 of FIG. 14.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or non-transitory wireless technologies, then the coaxial cable, fiber optic cable, twisted pair, DSL, or the non-transitory wireless technologies are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for single carrier optimization for evolved Multimedia Broadcast Multicast Service (eMBMS) by at least one network entity, comprising:
    in a subframe of a radio spectrum, allocating a first set of resource elements (REs) for multimedia broadcast over a single frequency network (MBSFN) transmissions, each symbol corresponding to each RE of the first set having a first cyclic prefix (CP) type;
    allocating a second set of REs for unicast transmissions, each symbol corresponding to each RE of the second set having a second CP type;
    determining whether the first CP type and the second CP type are the same; and
    in response to the first CP type and the second CP type being the same, combining the MBSFN transmissions and the unicast transmissions in the subframe according to the allocated first and second sets of REs, wherein combining the MBSFN transmissions and the unicast transmissions comprises sending MBSFN reference signals on symbols devoid of unicast cell-specific reference signals (CRS).

2. The method of claim 1, wherein combining the MBSFN transmissions and the unicast transmissions further comprises sending MBSFN signals on symbols devoid of unicast CRS.

3. The method of claim 2, further comprising shifting a given one of MBSFN reference signals to a given symbol that is not being used by unicast reference signals.

4. The method of claim 2, further comprising sending unicast reference signals on symbols devoid of MBSFN reference signals.

5. The method of claim 4, further comprising shifting a given one of unicast reference signals to a given symbol that is not being used by MBSFN reference signals.

6. The method of claim 1, further comprising broadcasting shared content to multiple mobile entities, the content comprising a given MBSFN transmission.

7. The method of claim 6, further comprising transmitting CRSs on resource blocks (RBs) used for at least one of a Physical Broadcast Channel (PBCH), a System Information Block (SIB), and paging.

8. The method of claim 7, further comprising:
    identifying the RBs used for the at least one of the PBCH, the SIB and the paging for network entities participating in the MBSFN transmissions; and
    excluding the identified RBs from the MBSFN transmissions.

9. The method of claim 7, further comprising supplementing the RBs used for the at least one of the PBCH, the SIB and the paging with at least one additional RB, the at least one additional RB being dedicated to CRS transmission.

10. The method of claim 6, wherein broadcasting comprises broadcasting the shared content from at least one evolved NodeB (eNB) to a plurality of user equipment (UE).

11. The method of claim 1, further comprising implementing the first CP type for (a) a primary synchronization signal (PSS) or a secondary synchronization signal (SSS) and (b) a Physical Multicast Channel (PMCH), in response to a carrier of the first CP being used for eMBMS transmission and the carrier transmitting the PSS or the SSS.

12. An apparatus for single carrier optimization for evolved Multimedia Broadcast Multicast Service (eMBMS), comprising:
    at least one processor configured to: in a subframe of a radio spectrum, allocate a first set of resource elements (REs) for multimedia broadcast over a single frequency network (MBSFN) transmissions, each symbol corresponding to each RE of the first set having a first cyclic prefix (CP) type; allocate a second set of REs for unicast transmissions, each symbol corresponding to each RE of the second set having a second CP type; determine whether the first CP type and the second CP type are the same; and combine the MBSFN transmissions and the unicast transmissions in the subframe according to the allocated first and second sets of REs, in response to the first CP type and the second CP type being the same, wherein to combine the MBSFN transmissions and the unicast transmissions comprises sending MBSFN reference signals on symbols devoid of unicast cell-specific reference signals (CRS); and
    a memory coupled to the at least one processor for storing data.

13. The apparatus of claim 12, wherein the at least one processor combines the MBSFN transmissions and the unicast transmissions by further sending MBSFN signals on symbols devoid of unicast CRS.

14. The apparatus of claim 13, wherein the at least one processor shifts a given one of MBSFN reference signals to a given symbol that is not being used by unicast reference signals.

15. The apparatus of claim 13, wherein the at least one processor sends unicast reference signals on symbols devoid of MBSFN reference signals.

16. The apparatus of claim 15, wherein the at least one processor shifts a given one of unicast reference signals to a given symbol that is not being used by MBSFN reference signals.

17. The apparatus of claim 12, wherein the at least one processor broadcasts shared content to multiple mobile entities, the content comprising a given MBSFN transmission.

18. The apparatus of claim 17, wherein the at least one processor transmits CRSs on resource blocks (RBs) used for at least one of a Physical Broadcast Channel (PBCH), a System Information Block (SIB), and paging.

19. The apparatus of claim 18, wherein the at least one processor:
    identifies the RBs used for the at least one of the PBCH, the SIB and the paging for network entities participating in the MBSFN transmissions; and
    excludes the identified RBs from the MBSFN transmissions.

20. The apparatus of claim 18, wherein the at least one processor supplements the RBs used for the at least one of the PBCH, the SIB and the paging with at least one additional RB, the at least one additional RB being dedicated to CRS transmission.

21. The apparatus of claim 12, wherein the at least one processor implements the first CP type for (a) a primary synchronization signal (PSS) or a secondary synchronization signal (SSS) and (b) a Physical Multicast Channel (PMCH), in response to a carrier of the first CP being used for eMBMS transmission and the carrier transmitting the PSS or the SSS.

22. An apparatus for single carrier optimization for evolved Multimedia Broadcast Multicast Service (eMBMS), the apparatus comprising:
    at least one processor component;
    a transceiver component;
    at least one electrical component; and
    a memory component including instructions that, when executed by the at least one processor component, cause the at least one electrical component to:
        allocate a first set of resource elements (REs) for multimedia broadcast over a single frequency network (MBSFN) transmissions, each symbol corresponding to each RE of the first set having a first cyclic prefix (CP) type;

allocate a second set of REs for unicast transmissions, each symbol corresponding to each RE of the second set having a second CP type;

determine whether the first CP type and the second CP type are the same; and combine the MBSFN transmissions and the unicast transmissions in a subframe of a radio spectrum according to the allocated first and second sets of REs, in response to the first CP type and the second CP type being the same, wherein the instructions further cause the at least one electrical component to send MBSFN reference signals on symbols devoid of unicast cell-specific reference signals (CRS) via the transceiver component.

23. The apparatus of claim 22, wherein the instructions further cause the at least one electrical component to send MBSFN signals on symbols devoid of unicast CRS via the transceiver component.

24. The apparatus of claim 23, wherein the instructions further cause the at least one electrical component to shift a given one of MBSFN reference signals to a given symbol that is not being used by unicast reference signals.

25. The apparatus of claim 23, wherein the instructions further cause the at least one electrical component to send unicast reference signals on symbols devoid of MBSFN reference signals via the transceiver component.

26. The apparatus of claim 25, wherein the instructions further cause the at least one electrical component to send a given one of unicast reference signals to a given symbol that is not being used by MBSFN reference signals.

27. The apparatus of claim 22, wherein the instructions further cause the at least one electrical component to broadcast shared content to multiple mobile entities via the transceiver component, the content comprising a given MBSFN transmission.

28. The apparatus of claim 27, wherein the instructions further cause the at least one electrical component to transmit CRSs on resource blocks (RBs) used for at least one of a Physical Broadcast Channel (PBCH), a System Information Block (SIB), and paging.

29. The apparatus of claim 28, wherein the instructions further cause the at least one electrical component to:
identify the RBs used for the at least one of the PBCH, the SIB and the paging for network entities participating in the MBSFN transmissions; and
exclude the identified RBs from the MBSFN transmissions.

30. The apparatus of claim 28, wherein the instructions further cause the at least one electrical component to supplement the RBs used for the at least one of the PBCH, the SIB and the paging with at least one additional RB, the at least one additional RB being dedicated to CRS transmission.

31. The apparatus of claim 22, wherein the instructions further cause the at least one electrical component to implement the first CP type for (a) a primary synchronization signal (PSS) or a secondary synchronization signal (SSS) and (b) a Physical Multicast Channel (PMCH), in response to a carrier of the first CP being used for eMBMS transmission and the carrier transmitting the PSS or the SSS.

32. A non-transitory computer-readable medium comprising code for causing a computer to:
allocate a first set of resource elements (REs) for multimedia broadcast over a single frequency network (MBSFN) transmissions, each symbol corresponding to each RE of the first set having a first cyclic prefix (CP) type;

allocate a second set of REs for unicast transmissions, each symbol corresponding to each RE of the second set having a second CP type;

determine whether the first CP type and the second CP type are the same; and combine the MBSFN transmissions and the unicast transmissions in a subframe of a radio spectrum according to the allocated first and second sets of REs, in response to the first CP type and the second CP type being the same, wherein to combine the MBSFN transmissions and the unicast transmissions comprises sending MBSFN reference signals on symbols devoid of unicast cell-specific reference signals (CRS).

33. The non-transitory computer-readable medium of claim 32, further comprising code for causing the computer to further send MBSFN signals on symbols devoid of unicast CRS.

34. The non-transitory computer-readable medium of claim 33, further comprising code for causing the computer to shift a given one of MBSFN reference signals to a given symbol that is not being used by unicast reference signals.

35. The non-transitory computer-readable medium of claim 33, further comprising code for causing the computer to send unicast reference signals on symbols devoid of MBSFN reference signals.

36. The non-transitory computer-readable medium of claim 35, further comprising code for causing the computer to shift a given one of unicast reference signals to a given symbol that is not being used by MBSFN reference signals.

37. The non-transitory computer-readable medium of claim 32, further comprising code for causing the computer to broadcast shared content to multiple mobile entities, the content comprising a given MBSFN transmission.

38. The non-transitory computer-readable medium of claim 37, further comprising code for causing the computer to broadcast shared content to transmit CRSs on resource blocks (RBs) used for at least one of a Physical Broadcast Channel (PBCH), a System Information Block (SIB), and paging.

39. The non-transitory computer-readable medium of claim 38, further comprising code for causing the computer to:
identify the RBs used for the at least one of the PBCH, the SIB and the paging for network entities participating in the MBSFN transmissions; and
exclude the identified RBs from the MBSFN transmissions.

40. The non-transitory computer-readable medium of claim 38, further comprising code for causing the computer to supplement the RBs used for the at least one of the PBCH, the SIB and the paging with at least one additional RB, the at least one additional RB being dedicated to CRS transmission.

41. The non-transitory computer-readable medium of claim 32, further comprising code for causing the computer to implement the first CP type for (a) a primary synchronization signal (PSS) or a secondary synchronization signal (SSS) and (b) a Physical Multicast Channel (PMCH), in response to a carrier of the first CP being used for eMBMS transmission and the carrier transmitting the PSS or the SSS.

* * * * *